United States Patent
Hiratsuka

(12) 
(10) Patent No.: US 10,480,665 B2
(45) Date of Patent: Nov. 19, 2019

(54) VALVE STRUCTURE, NONLUBRICATED LINEAR COMPRESSOR, AND CRYOCOOLER

(71) Applicant: SUMITOMO HEAVY INDUSTRIES, LTD., Tokyo (JP)

(72) Inventor: Yoshikatsu Hiratsuka, Nishitokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 49 days.

(21) Appl. No.: 15/298,595

(22) Filed: Oct. 20, 2016

(65) Prior Publication Data
US 2017/0114911 A1    Apr. 27, 2017

(30) Foreign Application Priority Data
Oct. 23, 2015 (JP) ................. 2015-208613

(51) Int. Cl.
*F16K 15/14* (2006.01)
*F16K 25/00* (2006.01)
(Continued)

(52) U.S. Cl.
CPC .......... *F16K 15/148* (2013.01); *F16K 15/031* (2013.01); *F16K 15/14* (2013.01);
(Continued)

(58) Field of Classification Search
CPC ........ F16K 15/14; F16K 15/148; F16K 15/16; Y10T 137/7891; Y10T 137/7892; F04B 39/0016; F04B 39/108; F04B 39/1086

See application file for complete search history.

(56) References Cited

U.S. PATENT DOCUMENTS 2,000,883 A * 5/1935 Cullen ................ F04B 39/0016
                                                137/857
2,689,552 A * 9/1954 Kiekhaefer ............. F01L 3/205
                                                123/73 V
(Continued)

FOREIGN PATENT DOCUMENTS

GB      1500391 A  *  2/1978  .......... F04B 39/0016
JP   S61-234283 A    10/1986
(Continued)

*Primary Examiner* — Mary E McManmon
*Assistant Examiner* — Richard K. Durden
(74) *Attorney, Agent, or Firm* — HEA Law PLLC

(57) ABSTRACT

A valve structure includes: a valve seat part furnished with a valve hole portion having a valve hole connecting a first gas chamber to a second gas chamber, and a valve-body supporting wall part laterally extending from the valve hole portion; an elastic valve-body member furnished with a first elastic platelike section disposed paralleling the valve hole portion, and a second elastic platelike section extending from the first elastic platelike section, wherein the first elastic platelike section is elastically deformable against the second elastic platelike section under pressure differential between the first gas chamber and the second gas chamber such as to open the valve hole; and an elastic pressing member arranged paralleling the second elastic platelike section such as to elastically deform together with the elastic valve-body member, and being of planar form configured so as to expose the first elastic platelike section.

16 Claims, 7 Drawing Sheets

(51) Int. Cl.
*F04B 39/10* (2006.01)
*F16K 15/03* (2006.01)
*F04B 39/00* (2006.01)

(52) U.S. Cl.
CPC ......... *F04B 39/0016* (2013.01); *F04B 39/108* (2013.01); *F04B 39/1086* (2013.01); *F16K 25/005* (2013.01)

(56) References Cited

U.S. PATENT DOCUMENTS

| | | | | |
|---|---|---|---|---|
| 4,180,975 | A * | 1/1980 | Takagi | F01N 3/22 60/290 |
| 4,664,154 | A * | 5/1987 | Kamata | F01L 3/205 123/73 V |
| 4,775,301 | A * | 10/1988 | Cartwright | F04B 17/046 137/859 |
| 5,243,934 | A * | 9/1993 | Boyesen | F01L 3/205 123/65 V |
| 5,257,915 | A | 11/1993 | Laskaris et al. | |
| 5,704,771 | A * | 1/1998 | Fujisawa | F04B 35/045 417/417 |
| 6,015,270 | A * | 1/2000 | Roth | F04B 3/00 417/259 |
| 6,733,245 | B2 * | 5/2004 | Oh | F04B 35/045 417/211 |
| 7,841,844 | B2 | 11/2010 | Park et al. | |
| 2003/0206817 | A1 * | 11/2003 | Oh | F04B 39/0016 417/417 |
| 2005/0198970 | A1 * | 9/2005 | Acharya | F25B 9/145 62/6 |
| 2007/0184238 | A1 * | 8/2007 | Hockaday | B32B 7/00 428/98 |
| 2008/0226477 | A1 * | 9/2008 | Wu | F04B 35/045 417/417 |
| 2012/0207632 | A1 * | 8/2012 | Usui | F02M 59/366 417/440 |
| 2013/0287611 | A1 * | 10/2013 | Schmidt | F04B 25/02 417/443 |
| 2015/0226210 | A1 * | 8/2015 | Barito | F04B 35/045 417/415 |

FOREIGN PATENT DOCUMENTS

| | | |
|---|---|---|
| JP | S62-034178 U | 2/1987 |
| JP | H05-099149 A | 4/1993 |
| JP | H06-026458 A | 2/1994 |
| JP | 2000-161228 A | 6/2000 |
| JP | 2005-264744 A | 9/2005 |
| JP | 2006-057634 A | 3/2006 |

* cited by examiner

VALVE STRUCTURE, NONLUBRICATED LINEAR COMPRESSOR, AND CRYOCOOLER

INCORPORATION BY REFERENCE

Priority is claimed to Japanese Patent Application No. 2015-208613, filed Oct. 23, 2015, the entire content which is incorporated herein by reference.

BACKGROUND

Technical Field

The present invention in particular embodiments relates to valve structures in valved nonlubricated linear compressors, and to nonlubricated linear compressors having the valve structures. In addition, the present invention in particular embodiments relates to cryogenic refrigerators having the nonlubricated linear compressors.

Description of Related Art

Attempts at applying nonlubricated linear compressors to cryogenic refrigerators have been proposed.

SUMMARY

One embodiment of the present invention affords a valve structure for a valved nonlubricated linear compressor. The valve structure comprises: a valve seat part including a valve hole portion having a valve hole connecting a first gas chamber to a second gas chamber, and a valve-body supporting wall part extending laterally from the valve hole portion; an elastic valve-body member furnished with a first elastic platelike section disposed paralleling the valve hole portion such as to cover the valve hole, and a second elastic platelike section extending from the first elastic platelike section and paralleling the valve-body supporting wall part, wherein the first elastic platelike section is elastically deformable relative to second elastic platelike section under pressure differential between the first gas chamber and the second gas chamber such as to uncover the valve hole; and an elastic pressing member arranged paralleling the second elastic platelike section such as to elastically deform together with the elastic valve-body member, the elastic pressing member being of planar form configured so as to expose the first elastic platelike section.

Another embodiment of the present invention affords a nonlubricated linear compressor including a valve structure as set forth above.

Still another embodiment of the present invention affords a cryocooler including the just-mentioned nonlubricated linear compressor.

DETAILED DESCRIPTION

Figure 1:
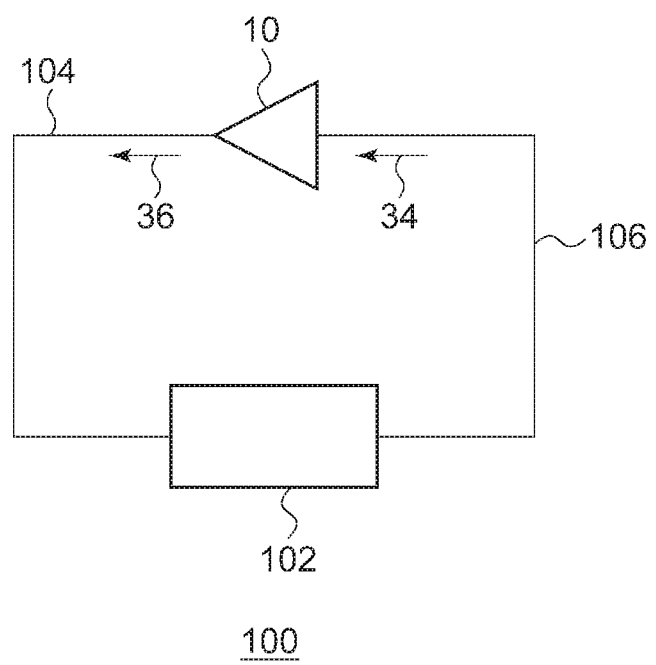
FIG. 1 is a schematic view showing a cryocooler according to an embodiment of the present invention.

A nonlubricated linear compressor includes a valve therein. A stopper which restricts a movement amount of a valve body may be provided in the valve. However, if the movement amount of the valve body is restricted, since a flow rate of gas flowing through the valve decreases, the flow rate of gas which is discharged from a linear compressor also decreases. In addition, noise may occur due to collision of the valve body with respect to the stopper. In this way, there is room for improvement for the nonlubricated linear compressor including the valve having a stopper.

It is desirable to provide an improved valve structure, a valved nonlubricated linear compressor having the valve structure, and a cryocooler having the nonlubricated linear compressor.

In addition, arbitrary combinations of the above-described components, or components or expression of the present invention may be replaced by each other in methods, devices, systems, or the like, and these replacements are also included in aspects of the present invention.

According to the present invention, it is possible to provide an improved valve structure, a valved nonlubricated linear compressor having the valve structure, and a cryocooler having the valved nonlubricated linear compressor.

Hereinafter, embodiments of the present invention will be described in detail with reference to the drawings. In addition, in descriptions thereof, the same reference numerals are assigned to the same elements, and overlapping descriptions thereof are omitted. In addition, configurations described below are exemplified, and do not limit the scope of the present invention.

FIG. 1 is a schematic view showing a cryocooler 100 according to an embodiment of the present invention. The cryocooler 100 includes a linear compressor 10 and an expander 102. For example, the expander 102 is a Gifford McMahon type expander, and in this case, the cryocooler 100 is a Gifford McMahon type cryocooler.

A discharge port of the linear compressor 10 is connected to the expander 102 through a high-pressure pipe 104. Moreover, a suction port of the linear compressor 10 is connected to the expander 102 through a low-pressure pipe 106. A high-pressure working gas 36 is supplied from the linear compressor 10 to the expander 102 through the high-pressure pipe 104. The high-pressure working gas 36 is adiabatically expanded in the expander 102, and thus, the expander 102 generates coldness. A low-pressure working gas 34 is recovered from the expander 102 to the linear compressor 10 through the low-pressure pipe 106. The linear compressor 10 compresses the low-pressure working gas 34 and supplies the compressed gas as the high-pressure working gas 36 to the expander 102 again. For example, the working gas is a helium gas.

Figure 2:
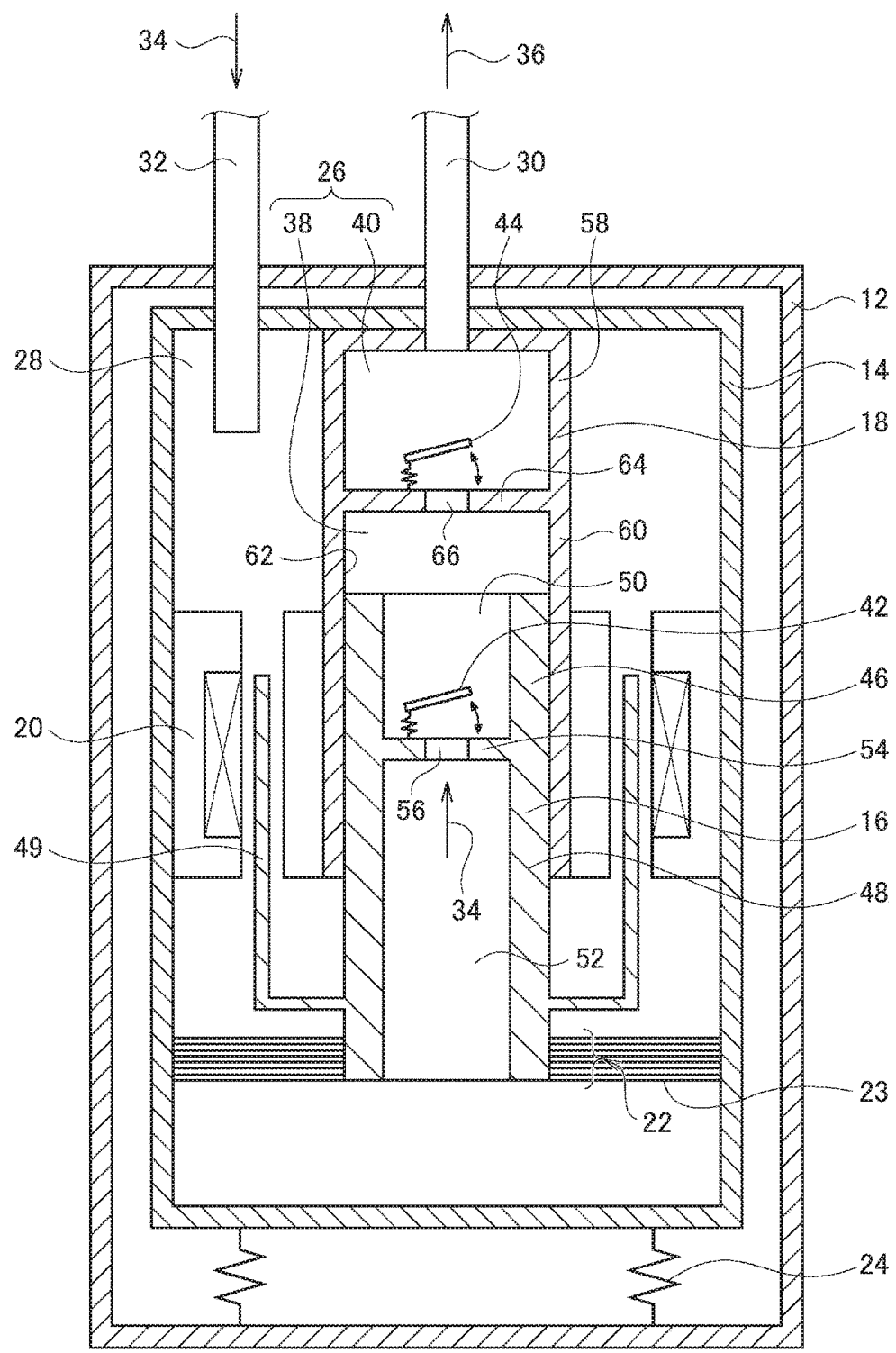
FIG. 2 is a sectional view schematically showing a linear compressor shown in FIG. 1.

FIG. 2 is a sectional view schematically showing the linear compressor 10 shown in FIG. 1. The linear compressor 10 includes a compressor case 12, a compressor container 14, a piston 16, a cylinder 18, a linear actuator 20, and a leaf spring unit 22. In the linear compressor 10, one piston 16, and one cylinder 18 which accommodates the piston 16 are provided. The linear compressor 10 is configured of a nonlubricated linear compressor (may be referred to as an oil-less linear compressor) in which oil is not used so as to lubricate a movable element.

The compressor case 12 accommodates the compressor container 14. Dynamic vibration absorbers 24 for preventing vibrations of the compressor container 14 from being transmitted to the outside or decreasing the vibrations are provided between the compressor case 12 and the compressor container 14. The compressor case 12 may be a cover member which covers the dynamic vibration absorbers 24.

The compressor container 14 is a pressure container which is configured so as to airtightly hold a working gas in the linear compressor 10. The compressor container 14 accommodates the piston 16, a cylinder 18, the linear actuator 20, and the leaf spring unit 22.

The compressor container 14 includes a high-pressure chamber 26 and a low-pressure chamber 28 of a working gas therein. A discharge pipe 30 is connected to the high-pressure chamber 26, and a suction pipe 32 is connected to the low-pressure chamber 28. The discharge pipe 30 penetrates the compressor case 12 and the compressor container 14, and connects the high-pressure chamber 26 to the outside of the linear compressor 10. The suction pipe 32 penetrates the compressor case 12 and the compressor container 14, and connects the low-pressure chamber 28 to the outside of the linear compressor 10. Accordingly, the low-pressure working gas 34 is recovered from the outside of the linear compressor 10 to the low-pressure chamber 28 through the suction pipe 32. In addition, the high-pressure working gas 36 is supplied from the high-pressure chamber 26 to the outside of the linear compressor 10 through the discharge pipe 30.

In addition, with the compressor container 14 or instead of the compressor container 14, the compressor case 12 may be configured as a pressure container which airtightly holds the working gas in the linear compressor 10.

The piston 16 is a movable body which partitions the inside of the compressor container 14 into the high-pressure chamber 26 and the low-pressure chamber 28. The high-pressure chamber 26 includes a pressurization chamber 38 and a discharge chamber 40. The pressurization chamber 38 is formed between the piston 16 and the cylinder 18. The discharge chamber 40 is formed inside the cylinder 18. The discharge pipe 30 is connected to the discharge chamber 40.

The linear compressor 10 is configured as a valved linear compressor. An intake valve 42 for supplying the low-pressure working gas 34 from the low-pressure chamber 28 to the high-pressure chamber 26 is provided in the piston 16. The intake valve 42 is opened and closed by a pressure difference between the high-pressure chamber 26 and the low-pressure chamber 28. The intake valve 42 is opened when the pressure difference exceeds a predetermined threshold value, and is closed when the pressure difference is lower than the threshold value. A discharge valve 44 for discharging the high-pressure working gas 36 from the pressurization chamber 38 to the discharge chamber 40 is provided in the cylinder 18. The discharge valve 44 is opened and closed by a pressure difference between the pressurization chamber 38 and the discharge chamber 40. The discharge valve 44 is opened when the pressure difference exceeds a predetermined threshold value, and is closed when the pressure difference is lower than the threshold value. For example, the intake valve 42 and the discharge valve 44 are reed valve type valves.

The piston 16 is a hollow cylindrical member which extends in an axial direction (a vertical direction in FIG. 2). The piston 16 includes a piston tip portion 46 which faces the pressurization chamber 38, and a piston main body portion 48 which extends from the piston tip portion 46 toward the side opposite to the pressurization chamber 38 in the axial direction. A first piston recessed portion 50 is formed in the piston tip portion 46, and a second piston recessed portion 52 is formed in the piston main body portion 48. The first piston recessed portion 50 is a hollow portion of the piston tip portion 46, and forms a portion of the pressurization chamber 38. The second piston recessed portion 52 is a hollow portion of the piston main body portion 48, and forms a portion of the low-pressure chamber 28.

A piston partition portion 54 is provided between the piston tip portion 46 and the piston main body portion 48. The piston partition portion 54 is a wall which partitions the piston into the first piston recessed portion 50 and the second piston recessed portion 52. A piston communication hole 56 is formed at the center of the piston partition portion 54. The piston communication hole 56 communicates with the first piston recessed portion 50 and the second piston recessed portion 52. The intake valve 42 is accommodated in the first piston recessed portion 50. The intake valve 42 is configured so as to open and close the piston communication hole 56 by a pressure difference between the first piston recessed portion 50 and the second piston recessed portion 52.

The piston 16 is supported by the compressor container 14 in a manner enabling reciprocation (for example, in a manner enabling vibration) in the axial direction by the leaf spring unit 22. A radial inner portion of the leaf spring unit 22 is attached to the base end portion of the piston main body portion 48 so as to circumferentially surround the piston 16. A radial outer portion of the leaf spring unit 22 is attached to the compressor container 14.

Moreover, the piston 16 includes a piston drive portion 49 which is driven by the linear actuator 20. The piston drive portion 49 is attached to the piston main body portion 48.

The cylinder 18 is a hollow cylindrical member which extends in the axial direction so as to accommodate the piston 16. The cylinder 18 is supported so as to be fixed to the compressor container 14. The cylinder 18 includes a cylinder fixing end portion 58 which is fixed to the compressor container 14, and a cylinder main body portion 60 which extends from the cylinder fixing end portion 58 toward the piston 16 in the axial direction. The discharge chamber 40 is formed in the cylinder fixing end portion 58. The cylinder main body portion 60 includes a cylinder inner surface 62 which slidably supports the piston 16 in the axial direction. A cylinder partition portion 64 is provided between the cylinder fixing end portion 58 and the cylinder main body portion 60. A cylinder communication hole 66 is formed at the center of the cylinder partition portion 64. The cylinder communication hole 66 communicates with the discharge chamber 40 and the pressurization chamber 38. The discharge valve 44 is accommodated in the discharge chamber 40, and is configured so as to open and close the cylinder communication hole 66 by a pressure difference between the discharge chamber 40 and the pressurization chamber 38.

The linear actuator 20 is configured to be driven so as to reciprocate the piston 16 in the axial direction. A forward movement and a backward movement of the piston 16 in the axial direction are periodically repeated by the driving of the linear actuator 20. The forward movement of the piston 16 is a upward movement in FIG. 2, and the backward movement of the piston 16 is a downward movement in FIG. 2. For example, the linear actuator 20 is a linear vibration actuator which vibrates the piston 16 in the axial direction.

The leaf spring unit 22 is a bearing which allows reciprocation of the piston 16 in the axial direction and restricts the movements of the piston 16 in the radial direction and the circumferential direction. The leaf spring unit 22 includes a plurality of leaf springs 23. The plurality of leaf springs 23 are arranged in series in the axial direction, and for example, include at least ten leaf springs 23. In the plurality of leaf springs 23, each leaf spring 23 elastically supports the piston 16 to the compressor container 14 such that the piston 16 can reciprocate in the axial direction. Each leaf spring 23 extends along a plane perpendicular to the axial direction. The leaf spring 23 is referred to as a flexure spring, is soft in the reciprocation direction of the piston 16, and is rigid in the direction perpendicular to the reciprocation direction.

The plurality of leaf springs 23 are disposed so as to be adjacent to each other with gaps in the axial direction. The leaf springs 23 are disposed with gaps in the axial direction such that the leaf springs 23 do not come into contact with each other. For example, the gas between two leaf springs 23 adjacent to each other in the axial direction is determined such that the two leaf springs 23 do not come into contact with each other by elastic deformation generated by the reciprocation of the piston 16. In order to maintain an appropriate gap, a spacer or a pressing member may be provided between two leaf springs 23.

In this way, an axial vibration system is configured in which the piston 16 is provided as a mass element and the leaf spring unit 22 is provided as an elastic element. For example, the vibration system is designed so as to provide a desired resonant frequency by appropriately setting axial stiffness of each leaf spring 23 of the leaf spring unit 22. The vibration system is driven by the linear actuator 20.

The piston is designed so as to be axially movable in a region determined so as to apply a cycle of a desired volume change to the high-pressure chamber 26 (for example, pressurization chamber 38). For example, the axial movable region of the piston 16 may be determined such that the piston 16 (for example, piston tip portion 46) abuts on or comes into contact with a facing portion (for example, cylinder partition portion 64) of the cylinder 18 at a top dead center when the piston 16 moves forward, and the tip surface of the piston 16 is separated from the facing portion of the cylinder 18 by a predetermined distance at a bottom dead center when the piston 16 moves backward. Alternatively, the axial movable region may be determined to a predetermined separation distance such that the tip surface of the piston 16 does not come into contact with the facing portion of the cylinder 18 at the top dead center.

Here, a basic operation of the linear compressor 10 will be described. As described above, the low-pressure working gas 34 is recovered from the outside of the linear compressor 10 to the low-pressure chamber 28 through the suction pipe 32. When the piston 16 moves to the bottom dead center or the vicinity thereof, the intake valve 42 is opened and the discharge valve 44 is closed. The low-pressure working gas 34 is supplied from the second piston recessed portion 52 to the pressurization chamber 38 through the piston communication hole 56. When the piston 16 moves forward from the bottom dead center to the top dead center, the intake valve 42 is closed, and the working gas inside the pressurization chamber 38 and the discharge chamber 40 is compressed so as to be boosted.

When the piston 16 moves to the top dead center or the vicinity thereof, the discharge valve 44 is opened, and the high-pressure working gas 36 is supplied from the discharge chamber 40 to the outside of the linear compressor 10 through the discharge pipe 30. When the piston 16 moves backward from the top dead center to the bottom dead center, the discharge valve 44 is closed, and the working gas inside the pressurization chamber 38 and the discharge chamber 40 is expanded so as to be decompressed. When the piston 16 is returned to the bottom dead center or the vicinity thereof, the intake valve 42 is opened, and the low-pressure working gas 34 is supplied to the pressurization chamber 38 again. In this way, a compression cycle is repeated in the linear compressor 10.

Figure 3A:
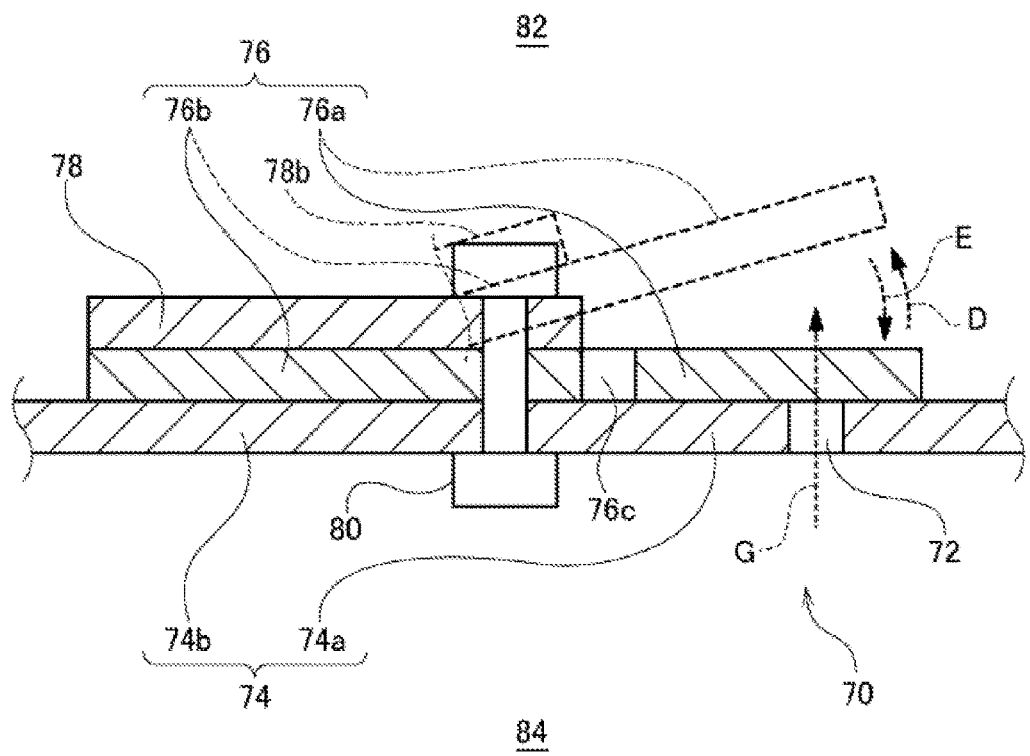
FIG. 3A is a sectional view schematically showing a valve structure of a valved nonlubricated linear compressor according to an embodiment of the present invention.
Figure 3B:
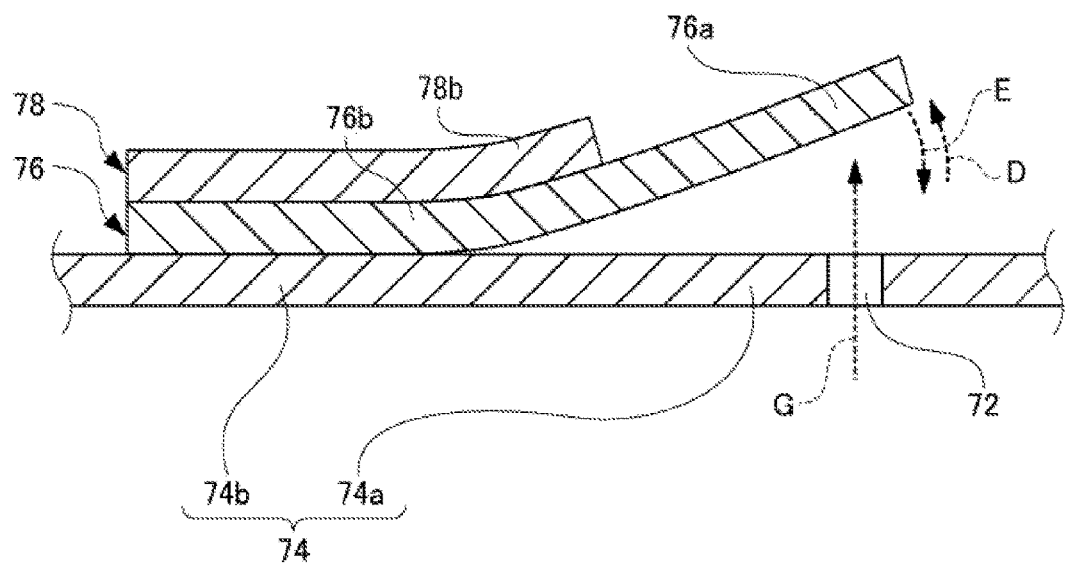
FIG. 3B is a sectional view schematically showing deformation of the elastic pressing member together with the elastic valve-body member of a valved nonlubricated linear compressor according to an embodiment of the present invention.

FIGS. 3A and 3B are sectional views schematically showing a valve structure 70 of a valved nonlubricated linear compressor according to an embodiment of the present invention. The valve structure 70 includes a valve seat portion 74 having a valve hole 72, an elastic valve body member 76, an elastic pressing member 78, and a fixing member 80. The valve structure 70 is disposed between a first gas chamber 82 and a second gas chamber 84. The first gas chamber 82 communicates with the second gas chamber 84 through the valve hole 72. When the valve structure 70 is closed, the valve structure 70 blocks the first gas chamber 82 from the second gas chamber 84. The valve structure 70 blocks a flow of a working gas between the first gas chamber 82 and the second gas chamber 84 through the valve hole 72. Meanwhile, the valve structure 70 is open, the valve structure 70 allows the first gas chamber 82 to communicate with the second gas chamber 84. The valve structure 70 allows the flow of a working gas between the first gas chamber 82 and the second gas chamber 84 through the valve hole 72.

The valve structure 70 may be the above-described intake valve 42. In this case, the valve hole 72 and the valve seat portion 74 respectively correspond to the piston communication hole 56 and the piston partition portion 54 shown in FIG. 2. The first gas chamber 82 and the second gas chamber 84 respectively correspond to the high-pressure chamber 26 and the low-pressure chamber 28. Alternatively, the valve structure 70 may be the above-described discharge valve 44. In this case, the valve hole 72 and the valve seat portion 74 respectively correspond to the cylinder communication hole 66 and the cylinder partition portion 64 shown in FIG. 2. The first gas chamber 82 and the second gas chamber 84 respectively correspond to the discharge chamber 40 and the pressurization chamber 38.

The valve seat portion 74 includes a valve hole portion 74a having a valve hole 72, and a valve body support wall portion 74b which extends laterally from the valve hole portion 74a. The valve hole portion 74a is a portion of the valve seat portion 74 which defines the valve hole 72, and the valve body support wall portion 74b which is a portion of other portions of the valve seat portion 74 which does not have the valve hole 72. Accordingly, the valve hole portion 74a and the valve body support wall portion 74b may be respectively referred to as a wall portion with a hole and a wall portion without a hole of the valve seat portion 74.

The valve seat portion 74 extends to be flat along a surface perpendicular to the axial direction (similarly to FIG. 2, vertical direction in FIGS. 3A and 3B). The valve body support wall portion 74b is continuous to the valve hole portion 74a such that the flat surface of the valve body support wall portion 74b is formed along with the valve hole portion 74a. For example, in a case where the valve seat portion 74 have a circular plate shape, the valve hole portion 74a may occupy a semicircular region (alternatively, a fan-shaped region or an arc-shaped region) which is positioned on one side of the circular plate, and the valve body support wall portion 74b may occupy a semicircular region (alternatively, a fan-shaped region or an arc-shaped region) positioned on a side opposite to the valve hole portion 74a.

The elastic valve body member 76 includes a first elastic plate-shaped portion 76a and a second elastic plate-shaped portion 76b. The first elastic plate-shaped portion 76a is disposed along the valve hole portion 74a so as to cover the valve hole 72. The second elastic plate-shaped portion 76b extends laterally from the first elastic plate-shaped portion 76a and is disposed along the valve body support wall portion 74b. The first elastic plate-shaped portion 76a can be elastically deformed with respect to the second elastic plate-shaped portion 76b so as to open the valve hole 72 by a pressure difference between the first gas chamber 82 and the second gas chamber 84. The elastic valve body member 76 may be a leaf spring which is soft in the axial direction and is rigid in the direction perpendicular to the axial direction. A relative movement of the first elastic plate-shaped portion 76a with respect to the valve hole 72 is shown by broken lines in FIG. 3A. The elastic valve body member 76 operates as a valve body which can be elastically displaced so as to open and close the valve hole 72.

The first elastic plate-shaped portion 76a and the second elastic plate-shaped portion 76b form an integral member (that is, elastic valve body member 76) which is continuous to each other. For example, in a case where the elastic valve body member 76 has a circular plate shape, the first elastic plate-shaped portion 76a may be a semicircular portion (alternatively, a fan-shaped region or an arc-shaped region) which is positioned on one side of the circular plate, and the second elastic plate-shaped portion 76b may be a semicircular portion (alternatively, a fan-shaped region or an arc-shaped region) positioned on a side opposite to the first elastic plate-shaped portion 76a. In addition, the elastic valve body member 76 includes a slit 76c which is positioned between the first elastic plate-shaped portion 76a and the second elastic plate-shaped portion 76b.

The elastic pressing member 78 is disposed along the second elastic plate-shaped portion 76b so as to be elastically deformed along with the elastic valve body member 76. The elastic pressing member 78 has a planar shape which is defined so as to expose the first elastic plate-shaped portion 76a. In this way, the elastic pressing member 78 is positioned at a location corresponding to the valve body support wall portion 74b (that is, a wall portion without a hole) of the valve seat portion 74. The elastic pressing member 78 is not present on the valve hole portion 74a, and thus, an upward space of the first elastic plate-shaped portion 76a in the axial direction is open.

The elastic pressing member 78 may have the same thickness as that of the elastic valve body member 76. Alternatively, the elastic pressing member 78 may have a thickness different from that of the elastic valve body member 76. By adjusting the thickness of the elastic pressing member 78, it is possible to adjust axial stiffness of the elastic pressing member 78.

One surface of the elastic valve body member 76 is in contact with the valve seat portion 74, and the other surface of the elastic valve body member 76 is in contact with the elastic pressing member 78. More specifically, one surface of the first elastic plate-shaped portion 76a is in contact with the valve hole portion 74a, and the other surface thereof is not in contact with any member. One surface of the second elastic plate-shaped portion 76b is in contact with the valve body support wall portion 74b, and the other surface thereof is in contact with the elastic pressing member 78.

Moreover, if necessary, any plate-shaped or film-shaped member may be interposed between the elastic valve body member 76 and the valve seat portion 74. In addition, any plate-shaped or film-shaped member may be interposed between the elastic valve body member 76 and the elastic pressing member 78.

The fixing member 80 fixes the elastic valve body member 76 and the elastic pressing member 78 to the valve seat portion 74 in a state where the elastic valve body member 76 is interposed between the elastic pressing member 78 and the valve seat portion 74. For example, the fixing member 80 may be a fastening member such as a bolt. Each of the valve seat portion 74, the elastic valve body member 76, and the elastic pressing member 78 may have a through-hole (for example, bolt hole) through which the fixing member 80 passes.

Figure 4:
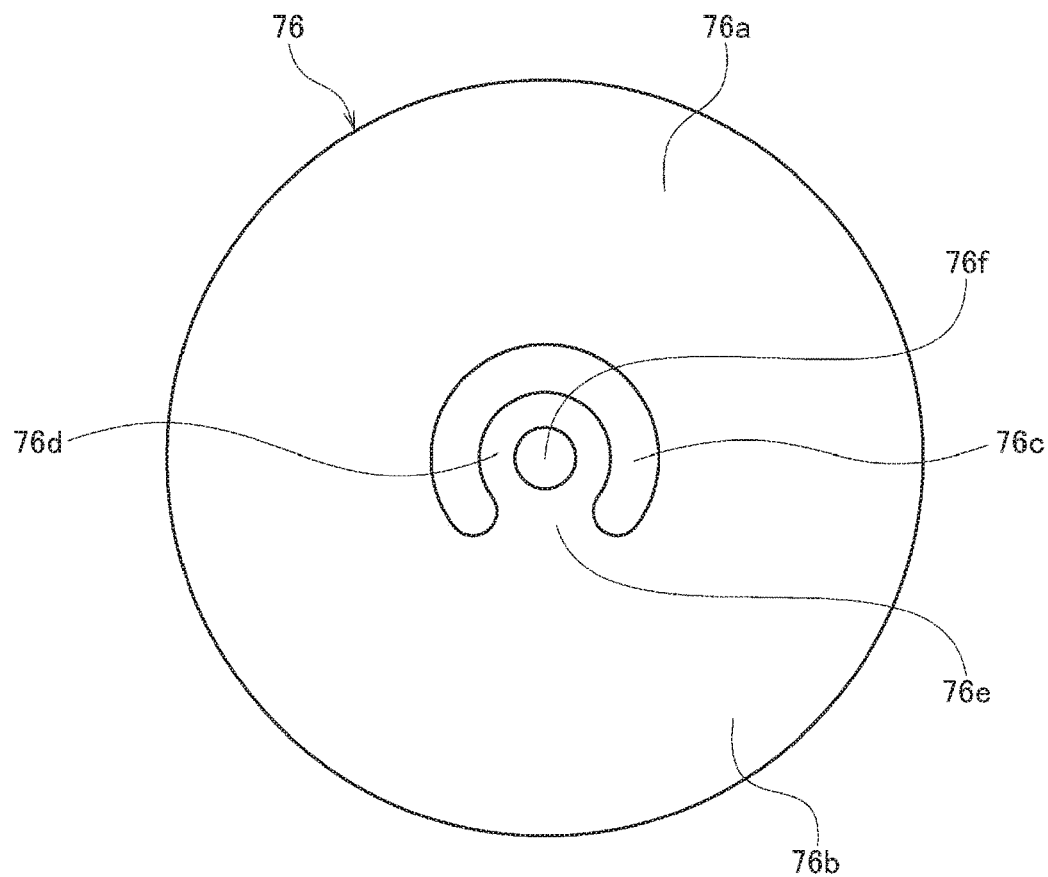
FIG. 4 is a plan view schematically showing an elastic valve body member shown in FIGS. 3A and 3B.

FIG. 4 is a plan view schematically showing the elastic valve body member 76 shown in FIGS. 3A and 3B. The elastic valve body member 76 includes a fulcrum portion 76d and a connecting portion 76e in addition to the first elastic plate-shaped portion 76a and the second elastic plate-shaped portion 76b. The fulcrum portion 76d is separated from the first elastic plate-shaped portion 76a by the slit 76c. The slit 76c is an arc-shaped slit, and partially surrounds the fulcrum portion 76d. The connecting portion 76e radially extends from the fulcrum portion 76d to the side opposite to the slit 76c. The connecting portion 76e connects the fulcrum portion 76d to the second elastic plate-shaped portion 76b. The second elastic plate-shaped portion 76b is continuous to the first elastic plate-shaped portion 76a in the circumferential direction. Since a center angle of the arc-shaped slit is greater than 180°, a center angle of the connecting portion 76e is smaller than 180°. According to this, the first elastic plate-shaped portion 76a has a fan shape having a center angle which is greater than 180°, and the second elastic plate-shaped portion 76b has a fan shape having a center angle which is smaller than 180°.

The fulcrum portion 76d is positioned at the center of the elastic valve body member 76. The fulcrum portion 76d has a through-hole 76f, through which the fixing member 80 passes, at the center of the fulcrum portion 76d. Accordingly, the fulcrum portion 76d has an annular shape which surrounds the through-hole 76f. The fulcrum portion 76d is fixed to the valve body support wall portion 74b by the above-described fixing member 80.

Figure 5:
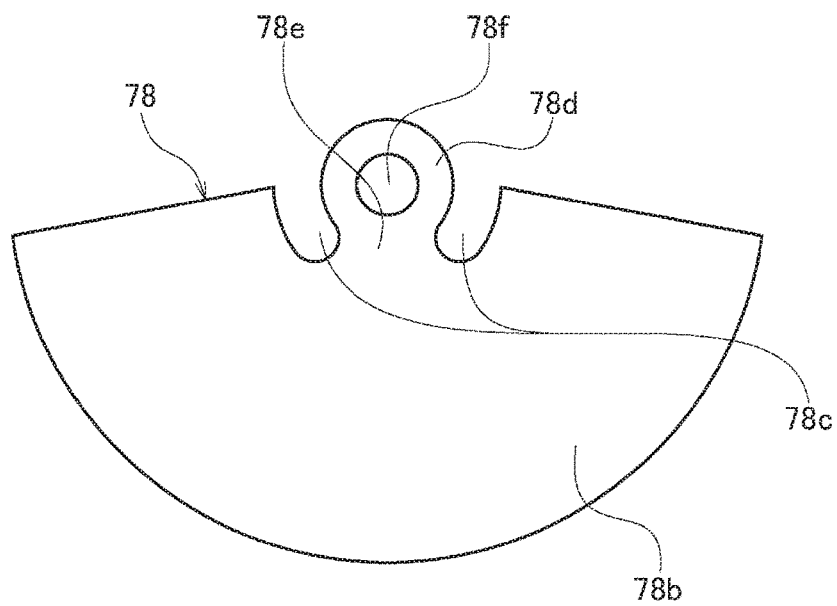
FIG. 5 is a plan view schematically showing an elastic pressing member shown in FIGS. 3A and 3B.

FIG. 5 is a plan view schematically showing the elastic pressing member 78 shown in FIGS. 3A and 3B. The elastic pressing member 78 has the same shape as that of a portion of the elastic valve body member 76 in a plan view. The elastic pressing member 78 includes the elastic plate-shaped portion 78b, the fulcrum portion 78d, and the connecting portion 78e, which respectively have shapes similar to those of the second elastic plate-shaped portion 76b, the fulcrum portion 76d, and the connecting portion 78e of the elastic valve body member 76 in a plan view. In addition, the elastic pressing member 78 includes notches 78c corresponding to both ends of the slit 76c of the elastic valve body member 76, and a through-hole 78f corresponding to the through-hole 76f of the elastic valve body member 76. The fulcrum portion 78d of the elastic pressing member 78 is fixed to the valve body support wall portion 74b along with the fulcrum portion 76d of the elastic valve body member 76 by the above-described fixing member 80.

Figure 6:
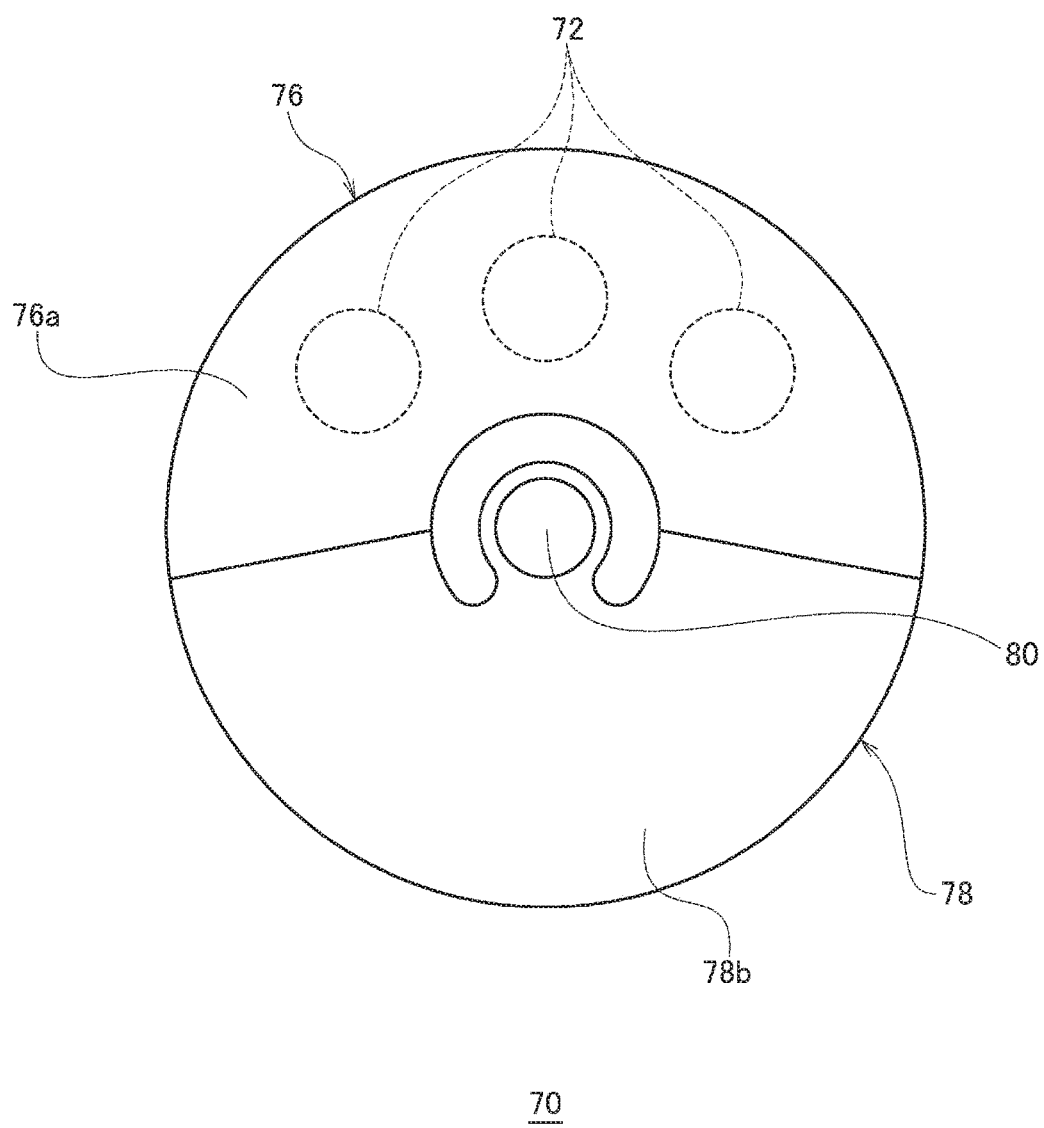
FIG. 6 is a top view schematically showing the valve structure shown in FIGS. 3A and 3B.

FIG. 6 is a top view schematically showing the valve structure 70 shown in FIGS. 3A and 3B. Accordingly, the elastic valve body member 76, the elastic pressing member 78 and the fixing member 80 are shown in FIG. 6. In addition, for easy understanding, the valve holes 72 are by broken lines in FIG. 6. In this example, the valve structure 70 includes three valve holes 72.

As shown in FIGS. 3 and 6, the first elastic plate-shaped portion 76a is disposed so as to cover the valve holes 72, and the second elastic plate-shaped portion 76b is disposed in the region in which the valve holes 72 are not present. The elastic pressing member 78 is superposed on the elastic valve body member 76, and similarly to the second elastic plate-shaped portion 76b, is disposed in the region in which the valve holes 72 are not present. The fixing member 80 fixes the elastic valve body member 76 and the elastic pressing member 78.

An operation of the valve structure 70 having the above-described configuration will be described. The valve structure 70 is opened and closed by the pressure difference between the first gas chamber 82 and the second gas chamber 84. When the pressure of the first gas chamber 82 increases with respect to the pressure of the second gas chamber 84 and the pressure difference between two chambers exceeds a predetermined threshold value, the first elastic plate-shaped portion 76a is elastically displaced with respect to the second elastic plate-shaped portion 76b (arrow D in FIGS. 3A and 3B). The first elastic plate-shaped portion 76a is separated from the valve hole portion 74a. As a result, a working gas flows (arrow G in FIGS. 3A and 3B) from the second gas chamber 84 into the first gas chamber 82 through the valve holes 72. Accordingly, the valve structure 70 is opened.

Thereafter, when the pressure difference between the two chambers is lower than the predetermined threshold value, the first elastic plate-shaped portion 76a is returned (arrow E in FIGS. 3A and 3B) to the initial position by a restoring force. The first elastic plate-shaped portion 76a comes into contact with the valve hole portion 74a again. The flow of the working gas from the second gas chamber 84 to the first gas chamber 82 is blocked. Accordingly, the valve structure 70 is closed.

Figure 7:
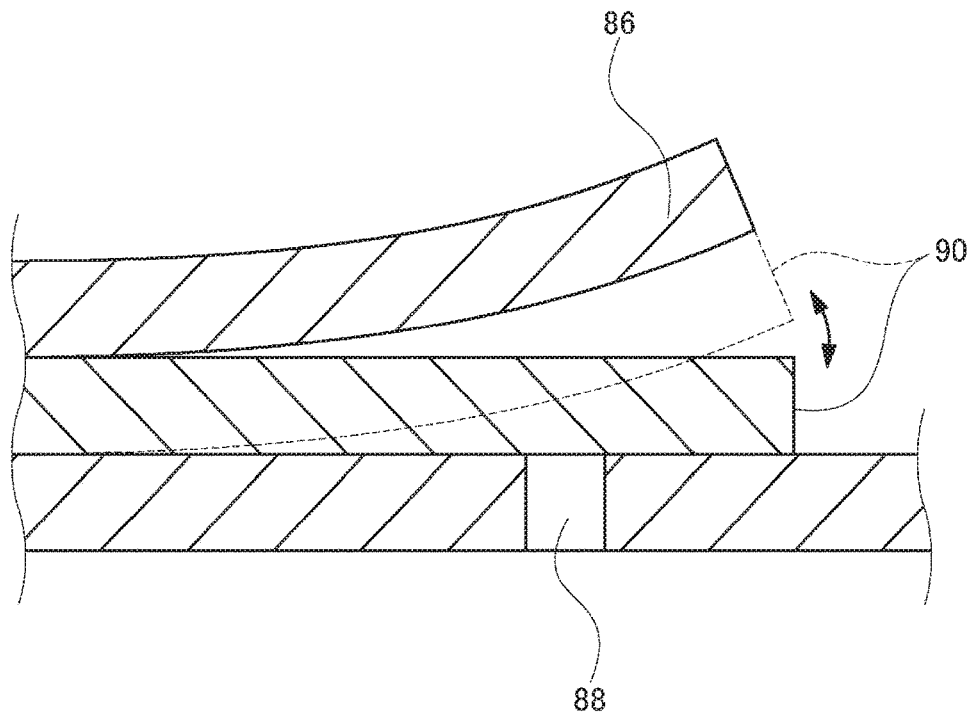
FIG. 7 is a sectional view schematically showing a portion of a reed valve having a stopper.

FIG. 7 is a sectional view schematically showing a portion of a reed valve having a stopper 86. The stopper 86 is disposed such that the tip portion thereof is separated from the valve hole 88 in the axial direction. A reed valve body 90 is separated from the stopper 86 so as to cover the valve hole 88. As shown by broken lines, when the reed valve body 90 opens the valve hole 88, an axial movement of the reed valve body 90 is restricted by the stopper 86. Since a lift amount of the reed valve body 90 is limited, a flow rate of the gas flowing through the valve is relatively small. In addition, collision of the reed valve body 90 with respect to the stopper 86 may generate noise.

However, according to the embodiment described with reference to FIGS. 1 to 6, the above of the first elastic plate-shaped portion 76a in the axial direction is open, and the valve structure 70 does not have the stopper which limits the movement of the elastic valve body member 76. Accordingly, it is possible to relatively increase the lift amount of the elastic valve body member 76. The flow rate of the gas flowing through the valve structure 70 increases, and the flow rate of the gas discharged by the linear compressor 10 increases. In addition, since the stopper is not present, collision noise generated by opening and closing of the valve structure 70 decreases.

When the first elastic plate-shaped portion 76a is axially displaced, the second elastic plate-shaped portion 76b is elastically deformed. The elastic pressing member 78 is elastically deformed according the elastic deformation of the second elastic plate-shaped portion 76b. In this way, the elastic pressing member 78 is integrally deformed with elastic valve body member 76, compared with a case where the elastic pressing member 78 is not present, it is possible to alleviate stress when the elastic valve body member 76 is elastically deformed. For example, stress concentration in the connection portion 76e and the second elastic plate-shaped portion 76b is alleviated. Accordingly, it is possible to prolong a service life of the elastic valve body member 76.

In addition, the planar shape of the elastic valve body member 76 contributes an increase in the lift amount. The first elastic plate-shaped portion 76a is separated from the fulcrum portion 76d by the slit 76c and the first elastic plate-shaped portion 76a is connected to the fulcrum portion 76d by the second elastic plate-shaped portion 76b and the connecting portion 76e. In addition, the fulcrum portion 76d is positioned at the center of the elastic valve body member 76. In this way, it is possible to lengthen the spring length of the elastic valve body member 76. Accordingly, the valve structure 70 having a large lift amount is obtained.

Figure 8:
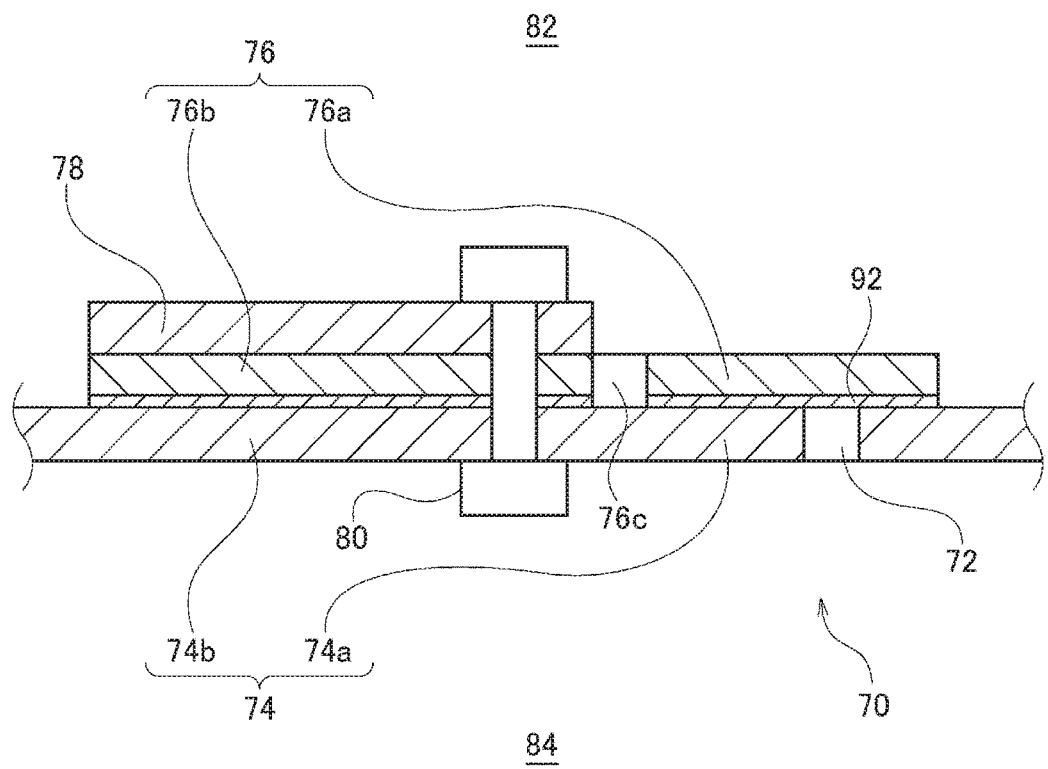
FIG. 8 is a sectional view schematically showing a valve structure of a valved nonlubricated linear compressor according to another embodiment of the present invention.

FIG. 8 is a sectional view schematically showing the valve structure 70 of a valved nonlubricated linear compressor according to another embodiment of the present invention. As shown in FIG. 8, the elastic valve body member 76 includes a fluoropolymer layer 92. A contact surface between the elastic valve body member 76 and the valve seat portion 74 is covered with the fluoropolymer layer 92. Moreover, both surfaces of the elastic valve body member 76 may be covered with the fluoropolymer layers 92. For example, the fluoropolymer layer 92 is formed of polytetrafluoroethylene (PTFE). Accordingly, it is possible to decrease collision noise between the elastic valve body member 76 and the valve seat portion 74. In addition, seal performance during closing of the valve structure 70, that is, sealability of the valve hole 72 by the elastic valve body member 76 is improved.

Figure 9:
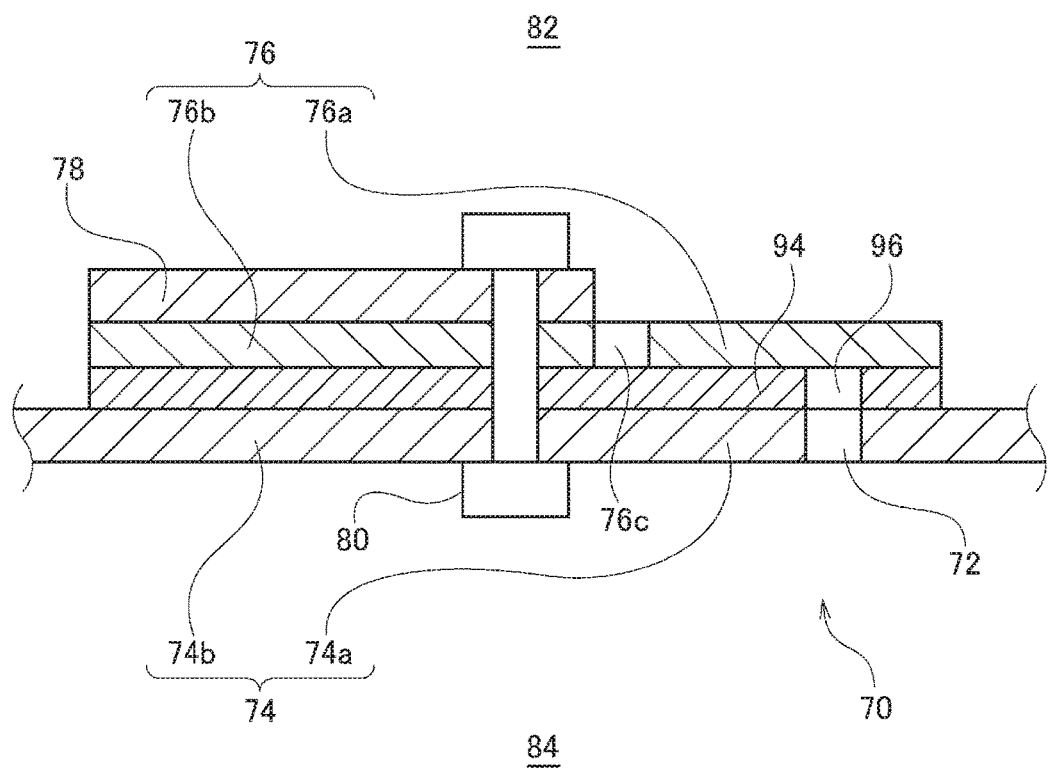
FIG. 9 is a sectional view schematically showing a valve structure of a valved nonlubricated linear compressor according to still another embodiment of the present invention.

FIG. 9 is a sectional view schematically showing the valve structure 70 of a valved nonlubricated linear compressor according to still another embodiment of the present invention. The valve structure 70 includes a fluoropolymer member 94 which is disposed between the valve seat portion 74 and the elastic valve body member 76. The fluoropolymer member 94 may be a film, a sheet, or a plate which is formed of a fluoropolymer such as polytetrafluoroethylene (PTFE). The fluoropolymer member 94 is disposed along the valve seat portion 74. One surface of the fluoropolymer member 94 is in contact with the valve seat portion 74, and the other surface of the fluoropolymer member 94 is in contact with the elastic valve body member 76.

The fluoropolymer member 94 has a planar shape similar to the elastic valve body member 76 except for having the opening portion 96. The opening portion 96 is formed at the location corresponding to the valve hole 72. Accordingly, the working gas passes through the valve hole 72 and the opening portion 96. The opening portion 96 may be a hole, a slit, or other opening portions.

The fluoropolymer member 94 may have the same thickness as that of the elastic valve body member 76. Alternatively, the fluoropolymer member 94 may have a thickness different from that of the elastic valve body member 76. In this way, the thickness of the fluoropolymer layer 92 can be greater than that of the fluoropolymer layer 92 shown in FIG. 8. This contributes a decrease in collision noise between the elastic valve body member 76 and the valve seat portion 74.

The opening portion 96 may be a hole having the same shape as that of the valve hole 72. The opening portion 96 may be a hole having a shape different from that of the valve hole 72. For example, the opening portion 96 may be a hole which is smaller than the valve hole 72. In a case where the fluoropolymer member 94 has flexibility in the axial direction, it is possible to axially lift the fluoropolymer member 94 by interaction between the working gas passing through the valve hole 72 and the fluoropolymer member 94. This contributes a decrease in noise during opening and closing of the valve structure 70.

It should be understood that the invention is not limited to the above-described embodiment, but may be modified into various forms on the basis of the spirit of the invention. Additionally, the modifications are included in the scope of the invention.

What is claimed is:

1. A valved nonlubricated linear compressor, comprising a compressor container,
a cylinder housed in the compressor container,
a movable piston accommodated in the cylinder, the movable piston partitioning the compressor container into a high-pressure chamber and a low-pressure chamber, wherein
the cylinder partitions the high-pressure chamber into a pressurization chamber formed between the movable piston and the cylinder, and a discharge chamber formed inside the cylinder,
a discharge pipe is connected to the discharge chamber, and a suction pipe is connected to the low-pressure chamber,
the movable piston comprises an intake valve for supplying gas from the low-pressure chamber to the pressurization chamber,
the cylinder comprises a discharge valve for discharging the gas from the pressurization chamber to the discharge chamber, and
at least one of the intake valve and the discharge valve is constituted by a valve structure comprising:
a fixing member;
a valve seat part including a valve hole portion positioned on a side of the valve seat part with respect to the fixing member, the valve hole portion having a valve hole either connecting the high-pressure chamber to the low-pressure chamber, or connecting the discharge chamber to the pressurization chamber, and a valve-body supporting wall part positioned on an opposite side of the valve seat part with respect to the fixing member, the valve-body supporting wall part extending laterally from the valve hole portion, wherein no valve hole is present in the valve-body supporting wall part;
an elastic valve-body member furnished with
a valve-body fulcrum portion fixed to the valve seat part with the fixing member,
a first elastic platelike section separated from the valve-body fulcrum portion by a slit and disposed paralleling the valve hole portion so as to cover the valve hole, and
a second elastic platelike section extending from the valve-body fulcrum portion opposite-ward with respect to the slit and paralleling the valve-body supporting wall part, wherein
the first and second elastic platelike sections are continuous to each other,
the first elastic platelike section is elastically deformable relative to the second elastic platelike section under pressure differential either between the high-pressure chamber and the low-pressure chamber, or between the discharge chamber and the pressurization chamber, so as to uncover the valve hole; and
a fan-shaped elastic pressing member furnished with
a pressing-member fulcrum portion fixed to the valve seat part with the fixing member, and
a pressing-member elastic platelike section extending from the pressing-member fulcrum portion opposite-ward with respect to the slit and paralleling the second elastic platelike section so as to elastically deform together with the elastic valve-body member, the fan-shaped elastic pressing member being of planar form configured so as to expose the first elastic platelike section; wherein
the pressing-member elastic platelike section and the second elastic platelike section of the elastic valve-body member are fan-shaped to match each other in plan view form.

2. The valved nonlubricated linear compressor according to claim 1, wherein the elastic valve-body member is covered with a fluoropolymer layer.

3. The valved nonlubricated linear compressor according to claim 1, further comprising:
a fluoropolymer member disposed between the valve seat part and the elastic valve-body member, and arranged paralleling the valve seat part.

4. The valved nonlubricated linear compressor according to claim 3, wherein the fluoropolymer member has an opening in a location corresponding to the valve hole.

5. The valved nonlubricated linear compressor according to claim 1, wherein the elastic valve-body member includes a valve-body connecting portion connecting the valve-body fulcrum portion to the second elastic platelike section opposite-ward with respect to the slit, and
wherein the fan-shaped elastic pressing member includes a pressing-member connecting portion connecting the pressing-member fulcrum portion to the pressing-member elastic platelike section opposite-ward with respect to the slit.

6. The valved nonlubricated linear compressor according to claim 5, wherein the pressing-member elastic platelike portion, the pressing-member fulcrum portion, and the pressing-member connecting portion, are of planar form identical to the second elastic platelike section, the valve-body fulcrum portion, and the valve-body connecting portion, respectively.

7. A cryocooler comprising the nonlubricated linear compressor according to claim 6.

8. The valved nonlubricated linear compressor according to claim 1, wherein the movable piston comprises a piston tip hollow portion having a first piston recess forming part of the pressurization chamber.

9. The valved nonlubricated linear compressor according to claim 1, wherein the movable piston comprises a piston main body hollow portion having a second piston recess forming part of the low-pressure chamber.

10. The valved nonlubricated linear compressor according to claim 1, wherein:
the movable piston comprises a piston tip hollow portion having a first piston recess, a piston main body hollow portion having a second piston recess and a piston partition wall connecting the piston tip hollow portion and the piston main body hollow portion; and the intake valve is housed in the first piston recess.

11. The valved nonlubricated linear compressor according to claim 10, wherein:

a piston communication hole is formed through the piston partition wall to communicate the first piston recess with the second piston recess; and the intake valve is configured so as to open and close the piston communication hole by a pressure difference between the first piston recess and the second piston recess.

12. The valved nonlubricated linear compressor according to claim 11, wherein:

the intake valve comprises the valve structure; and the valve hole and the valve seat part respectively correspond to the piston communication hole and the piston partition wall.

13. The valved nonlubricated linear compressor according to claim 1, wherein the cylinder comprises a cylinder base portion fixed to the compressor container and forming the discharge chamber, a cylinder main body portion forming the pressurization chamber between the movable piston and the cylinder main body portion, and a cylinder partition wall connecting the cylinder base portion and the cylinder main body portion.

14. The valved nonlubricated linear compressor according to claim 13, wherein:

a cylinder communication hole is formed through the cylinder partition wall to communicate the discharge chamber with the pressurization chamber; and the discharge valve is accommodated in the discharge chamber and is configured so as to open and close the cylinder communication hole by a pressure difference between the discharge chamber and the pressurization chamber.

15. The valved nonlubricated linear compressor according to claim 14, wherein:

the discharge valve comprises the valve structure; and the valve hole and the valve seat part respectively correspond to the cylinder communication hole and the cylinder partition wall.

16. The valved nonlubricated linear compressor according to claim 1, wherein the elastic valve-body member is circular-shaped, wherein the slit and the first elastic platelike section are arc-shaped and fan-shaped, respectively, and have a center angle which is greater than 180°, wherein the pressing-member elastic platelike section and the second elastic platelike section of the elastic valve-body member have a center angle which is smaller than 180°.

* * * * *